US009620776B2

United States Patent
Jun et al.

(10) Patent No.: US 9,620,776 B2
(45) Date of Patent: *Apr. 11, 2017

(54) METHOD FOR PREPARING LITHIUM IRON PHOSPHATE NANOPOWDER COATED WITH CARBON

(71) Applicant: LG Chem, Ltd., Seoul (KR)

(72) Inventors: In Kook Jun, Daejeon (KR); Seung Beom Cho, Daejeon (KR); Myoung Hwan Oh, Daejeon (KR); Wook Jang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/429,045

(22) PCT Filed: Jan. 9, 2014

(86) PCT No.: PCT/KR2014/000265
§ 371 (c)(1),
(2) Date: Mar. 18, 2015

(87) PCT Pub. No.: WO2014/109575
PCT Pub. Date: Jul. 17, 2014

(65) Prior Publication Data
US 2015/0357633 A1    Dec. 10, 2015

(30) Foreign Application Priority Data

Jan. 10, 2013  (KR) .................. 10-2013-0003032
Aug. 23, 2013  (KR) .................. 10-2013-0100182
Jan. 8, 2014   (KR) .................. 10-2014-0002575

(51) Int. Cl.
*H01M 4/13* (2010.01)
*H01M 4/58* (2010.01)
(Continued)

(52) U.S. Cl.
CPC ............. *H01M 4/366* (2013.01); *C01B 25/45* (2013.01); *C01G 49/009* (2013.01);
(Continued)

(58) Field of Classification Search
CPC ...... H01M 4/583; H01M 4/926; H01M 4/667; H01M 4/8825
See application file for complete search history.

(56) References Cited

U.S. PATENT DOCUMENTS 5,747,193 A    5/1998   Gerand et al.
7,390,472 B1   6/2008   Singhal et al.
(Continued)

FOREIGN PATENT DOCUMENTS

CN    1803591 A    7/2006
CN    101007630 A  8/2007
(Continued)

OTHER PUBLICATIONS

Jozwiak et al., "The thermal stability, local structure and electrical properties of lithium-iron phosphate glasses", Material Science-Poland, vol. 27, No. 1, 2009, pp. 307-318.*
(Continued)

*Primary Examiner* — Patrick Ryan
*Assistant Examiner* — Julian Anthony
(74) *Attorney, Agent, or Firm* — Lerner, David, Littenberg, Krumholz & Mentlik, LLP

(57) ABSTRACT

The present invention relates to a method for preparing a lithium iron phosphate nanopowder coated with carbon, including the steps of (a) preparing a mixture solution by adding a lithium precursor, an iron precursor and a phosphorus precursor in a reaction solvent, (b) putting the mixture solution into a reactor and reacting to prepare amorphous lithium iron phosphate nanoseed particle, and (c) heat treating the lithium iron phosphate nanoseed particle (Continued)

thus to prepare the lithium iron phosphate nanopowder coated with carbon on a portion or a whole of a surface of a particle, and a lithium iron phosphate nanopowder coated with carbon prepared by the above method. A lithium secondary battery including the lithium iron phosphate nanopowder coated with carbon thus prepared as a cathode active material has good capacity and stability.

15 Claims, 5 Drawing Sheets

(51) Int. Cl.
| | |
|---|---|
| H01M 4/00 | (2006.01) |
| H01M 4/82 | (2006.01) |
| H01M 6/00 | (2006.01) |
| H01M 4/36 | (2006.01) |
| H01M 10/0568 | (2010.01) |
| H01M 4/04 | (2006.01) |
| H01M 4/133 | (2010.01) |
| H01M 4/1393 | (2010.01) |
| H01M 4/1397 | (2010.01) |
| H01M 4/587 | (2010.01) |
| H01M 4/583 | (2010.01) |
| H01M 10/052 | (2010.01) |
| H01M 10/058 | (2010.01) |
| C01B 25/45 | (2006.01) |
| C01G 49/00 | (2006.01) |
| H01M 4/62 | (2006.01) |
| H01M 4/136 | (2010.01) |
| H01M 10/0525 | (2010.01) |
| H01M 4/02 | (2006.01) |

(52) U.S. Cl.
CPC ......... *H01M 4/0404* (2013.01); *H01M 4/049* (2013.01); *H01M 4/0471* (2013.01); *H01M 4/133* (2013.01); *H01M 4/1393* (2013.01); *H01M 4/1397* (2013.01); *H01M 4/58* (2013.01); *H01M 4/583* (2013.01); *H01M 4/587* (2013.01); *H01M 4/5825* (2013.01); *H01M 4/625* (2013.01); *H01M 10/052* (2013.01); *H01M 10/058* (2013.01); *H01M 10/0568* (2013.01); *H01M 4/136* (2013.01); *H01M 10/0525* (2013.01); *H01M 2004/028* (2013.01); *H01M 2220/30* (2013.01)

(56) References Cited

U.S. PATENT DOCUMENTS

| | | | |
|---|---|---|---|
| 8,771,877 B2 | 7/2014 | Yasunaga et al. | |
| 9,065,135 B2 | 6/2015 | Choy et al. | |
| 2004/0157126 A1 | 8/2004 | Belharouak et al. | |
| 2006/0035150 A1 | 2/2006 | Audemer et al. | |
| 2006/0263286 A1 | 11/2006 | Wu et al. | |
| 2007/0054187 A1* | 3/2007 | Nuspl | C01B 25/45 429/218.1 |
| 2007/0148082 A1 | 6/2007 | Heidelberg et al. | |
| 2009/0035204 A1 | 2/2009 | Xu et al. | |
| 2009/0117020 A1 | 5/2009 | Manthiram et al. | |
| 2009/0186275 A1 | 7/2009 | Exnar et al. | |
| 2009/0233096 A1 | 9/2009 | Schall et al. | |
| 2010/0013720 A1 | 1/2010 | Sakata et al. | |
| 2010/0074822 A1 | 3/2010 | Chung | |
| 2010/0183924 A1 | 7/2010 | Song et al. | |
| 2010/0248022 A1 | 9/2010 | Shirakata et al. | |
| 2010/0261060 A1 | 10/2010 | Choy et al. | |
| 2010/0279117 A1* | 11/2010 | Gu | C01B 25/37 428/402 |
| 2011/0017947 A1 | 1/2011 | Nuspl et al. | |
| 2011/0037019 A1 | 2/2011 | Nakano et al. | |
| 2011/0037030 A1 | 2/2011 | Holzapfel et al. | |
| 2011/0091772 A1 | 4/2011 | Mishima et al. | |
| 2011/0104553 A1* | 5/2011 | Pol | B82Y 30/00 429/156 |
| 2012/0003540 A1 | 1/2012 | Nakano et al. | |
| 2012/0058039 A1* | 3/2012 | Huang | B82Y 30/00 423/306 |
| 2012/0231334 A1 | 9/2012 | Kinoshita et al. | |
| 2012/0328947 A1 | 12/2012 | Chou et al. | |
| 2013/0029226 A1 | 1/2013 | Noh et al. | |
| 2013/0136989 A1 | 5/2013 | Wang et al. | |
| 2013/0137009 A1* | 5/2013 | Jin | H01M 4/926 429/482 |
| 2013/0157134 A1 | 6/2013 | Kintaka | |
| 2013/0209865 A1 | 8/2013 | Kim et al. | |
| 2014/0234195 A1 | 8/2014 | Kisailus et al. | |
| 2014/0239235 A1 | 8/2014 | Kong et al. | |
| 2015/0024265 A1 | 1/2015 | Jun et al. | |
| 2015/0024266 A1 | 1/2015 | Jun et al. | |
| 2015/0024271 A1 | 1/2015 | Jun et al. | |
| 2015/0030918 A1 | 1/2015 | Jun et al. | |
| 2015/0037665 A1 | 2/2015 | Jun et al. | |
| 2015/0037666 A1 | 2/2015 | Jun et al. | |
| 2015/0118561 A1 | 4/2015 | Gauthier et al. | |
| 2015/0236349 A1 | 8/2015 | Chiang et al. | |
| 2015/0280236 A1 | 10/2015 | Jun et al. | |
| 2015/0333329 A1 | 11/2015 | Jun et al. | |
| 2015/0357633 A1 | 12/2015 | Jun et al. | |

FOREIGN PATENT DOCUMENTS

| | | |
|---|---|---|
| CN | 101415640 A | 4/2009 |
| CN | 101591012 A | 12/2009 |
| CN | 101630773 A | 1/2010 |
| CN | 101635352 A | 1/2010 |
| CN | 101719548 A | 6/2010 |
| CN | 101777648 A | 7/2010 |
| CN | 101847742 A | 9/2010 |
| CN | 101944601 A | 1/2011 |
| CN | 102299322 A | 12/2011 |
| CN | 102356488 A | 2/2012 |
| CN | 102367170 A | 3/2012 |
| CN | 102420324 A | 4/2012 |
| CN | 10254488 A | 7/2012 |
| CN | 102790216 A | 11/2012 |
| EP | 2413402 A1 | 2/2012 |
| EP | 2413462 A1 | 2/2012 |
| EP | 2562859 A2 | 2/2013 |
| JP | 2002293517 A | 10/2002 |
| JP | 2005116393 A | 4/2005 |
| JP | 2006524623 A | 11/2006 |
| JP | 2007-511458 A | 5/2007 |
| JP | 2008103094 A | 5/2008 |
| JP | 2008-130526 A | 6/2008 |
| JP | 4223463 B2 | 2/2009 |
| JP | 2009-532323 A | 9/2009 |
| JP | 2010251302 A | 11/2010 |
| JP | 2011181452 A | 9/2011 |
| JP | 2012-123909 A | 6/2012 |
| JP | 2012155916 A | 8/2012 |
| JP | 2012167314 A | 9/2012 |
| JP | 2012195156 A | 10/2012 |
| JP | 2015-527290 A | 9/2015 |
| JP | 2015-527291 A | 9/2015 |
| JP | 2015-530965 A | 10/2015 |
| JP | 2015531738 A | 11/2015 |
| JP | 2015532632 A | 11/2015 |
| KR | 10-2007-0108664 A | 11/2007 |
| KR | 10-0808446 B1 | 3/2008 |
| KR | 10-0939647 B1 | 2/2010 |
| KR | 10-0940979 B1 | 2/2010 |
| KR | 10-1003136 B1 | 12/2010 |
| KR | 2011-0007112 A | 1/2011 |
| KR | 2011-0063390 A | 6/2011 |
| KR | 2011-0071653 A | 6/2011 |
| KR | 2011-0117629 A | 10/2011 |
| KR | 10-2011-0132566 A | 12/2011 |
| KR | 2012-0034060 A | 4/2012 |

(56) References Cited

FOREIGN PATENT DOCUMENTS

| KR | 2012-0038843 A | 4/2012 |
|---|---|---|
| KR | 2012-0123585 A | 11/2012 |
| TW | 201301644 A | 1/2013 |
| WO | 2007-113624 A1 | 10/2007 |
| WO | 2009131095 A1 | 10/2009 |
| WO | 2011132961 A2 | 10/2011 |
| WO | 2012-023439 A1 | 2/2012 |

OTHER PUBLICATIONS

International Search Report for Application No. PCT/KR2014/000262 dated Apr. 22, 2014.
International Search Report for Application No. PCT/KR2014/000264 dated Apr., 23, 2014.
International Search Report for Application No. PCT/KR2014/000265 dated Apr. 22, 2014.
International Search Report from PCT/KR2014/000267 dated Apr. 28, 2014.
International Search Report from PCT/KR2014/000268 dated Apr. 17, 2014.
International Search Report from PCT/KR2014/000269 dated Apr. 28, 2014.
International Search Report from PCT/KR2014/000271 dated Apr. 24, 2014.
International Search Report from PCT/KR2014/000274 dated Apr. 24, 2014.
International Search Report from PCT/KR2014/000275 dated Apr. 24, 2014.
Extended Search Report from European Application No. 14738215.4, dated Nov. 11, 2015.
Extended Search Report from European Application No. 14738106.5, dated Nov. 9, 2015.
Extended Search Report from European Application No. 14738008.3, dated Nov. 9, 2015.
Extended Search Report from European Application No. 14737816.0, dated Sep. 16, 2015.
Extended Search Report from European Application No. 14737874.9, dated Sep. 15, 2015.
Extended Search Report from European Application No. 14738037.2, dated Sep. 21, 2015.
Extended Search Report from European Application No. 14737518.2, dated Sep. 16, 2015.
Extended Search Report from European Application No. 14738003.4, dated Sep. 21, 2015.
Office Action from Chinese Application No. 201480002200.9, dated Nov. 12, 2015.
Office Action from Chinese Application No. 201480002313.9, dated Nov. 20, 2015.
Kim, Dong-Han, et al., Synthesis of LiFePO4 Nanoparticles in Polyol Medium and Their Electrochemical Properties, Electrochemical Solid-State Letters, 2006, vol. 9, No. 9, pp. 439-442.

* cited by examiner

METHOD FOR PREPARING LITHIUM IRON PHOSPHATE NANOPOWDER COATED WITH CARBON

CROSS REFERENCE TO RELATED APPLICATIONS

The present application is a national phase entry under 35 U.S.C. §371 of International Application No. PCT/KR2014/000265, filed Jan. 9, 2014, which claims priority from Korean Patent Application No. 10-2013-0003032, filed Jan. 10, 2013; Korean Patent Application No. 10-2013-0100182, filed Aug. 23, 2013; and Korean Patent Application No. 10-2014-0002575, filed Jan. 8, 2014; the disclosures of which are incorporated herein by reference.

BACKGROUND OF THE INVENTION

Field of the Invention

The present invention relates to a method for preparing a lithium iron phosphate nanopowder coated with carbon.

Description of the Related Art

As technical development and consumption of mobile devices increase, the demand for secondary batteries as energy sources is suddenly increasing. Among such secondary batteries, lithium secondary batteries having high energy density and voltage, a long life cycle, and a low self-discharge rate are being commercialized and widely used.

Common lithium secondary batteries use lithium cobalt oxide ($LiCoO_2$) as the main component of a cathode active material. However, since the cobalt oxide containing lithium is unstable and expensive, the mass production of lithium secondary batteries including thereof is difficult.

Recently, lithium iron phosphate ($LiFePO_4$) compound having a voltage against lithium of ~3.5 V, a high volume density of 3.6 $g/cm^3$, and a theoretical capacity of 170 mAh/g, as well as good stability at high temperature, and being cheap when compared to the lithium cobalt oxide, is being viewed as a suitable cathode active material for a lithium secondary battery.

As methods for preparing the lithium iron phosphate compound, a solid-state reaction method or a liquid-state reaction method such as a hydrothermal synthesis method and a supercritical hydrothermal synthesis is known. Recently, a glycothermal synthesis method is using a non-aqueous solvent such as ethylene glycol or diethylene glycol as a reaction solvent has been developed. According to the hydrothermal synthesis method and the supercritical hydrothermal synthesis method, the preparation of the lithium iron phosphate nanopowder is performed under high temperature and high pressure conditions, giving rise to safety concerns. In addition, according to the glycothermal synthesis method, the control of the particle size and the particle size distribution of the lithium iron phosphate nanopowder may be difficult.

The lithium iron phosphate has a relatively lower electric conductivity when compared to other cathode active materials including lithium. Particularly, lithium cobalt oxide ($LiCoO_2$) has the electric conductivity of about $10^{-4}$ S/cm and lithium manganese oxide ($LiMn_2O_4$) has about $10^{-5}$ S/cm. On the contrary, the electric conductivity of lithium iron phosphate is $10^{-9}$ S/cm, which is smaller by about 10,000 times or more. Therefore, cathode material particle is necessary to be prepared as small nano-sized particle to supplement the low electric conductivity of the lithium iron phosphate material, and a conductive layer having good electric conductivity is necessary to be formed on the surface of the cathode material particle to increase the electric conductivity.

SUMMARY OF THE INVENTION

An aspect of the present invention provides a method for preparing a lithium iron phosphate nanopowder including a carbon coating layer formed on particle, of which particle size and particle size distribution may be controlled by using a novel reaction solvent and by performing two simple steps of 1) preparing nanoseed particle in a short time which is the precursor of the lithium iron phosphate nanopowder and 2) heat treating thereof.

According to an aspect of the present invention, there is provided a method for preparing a lithium iron phosphate nanopowder coated with carbon including (a) preparing a mixture solution by adding a lithium precursor, an iron precursor and a phosphorus precursor in a reaction solvent, (b) putting the reaction mixture into a reactor and reacting to prepare amorphous lithium iron phosphate nanoseed particle, and (c) heat treating the lithium iron phosphate nanoseed particle thus to prepare the lithium iron phosphate nanopowder in which a portion or the whole of the surface of a particle is coated with carbon.

According to another aspect of the present invention, there is provided a lithium iron phosphate nanopowder coated with carbon prepared by the method, and a cathode active material including the same.

According to further another aspect of the present invention, there are provided a cathode including the cathode active material and a lithium secondary battery including the cathode.

According to the method for preparing a lithium iron phosphate nanopowder coated with carbon of the present invention, a lithium iron phosphate nanopowder including a carbon coating layer formed on particle may be prepared in a short time by performing two simple steps, while particle size and particle size distribution may be controlled.

A lithium secondary battery including the lithium iron phosphate nanopowder thus prepared as a cathode active material has good capacity and stability.

DETAILED DESCRIPTION OF THE PREFERRED EMBODIMENT

Figure 1:
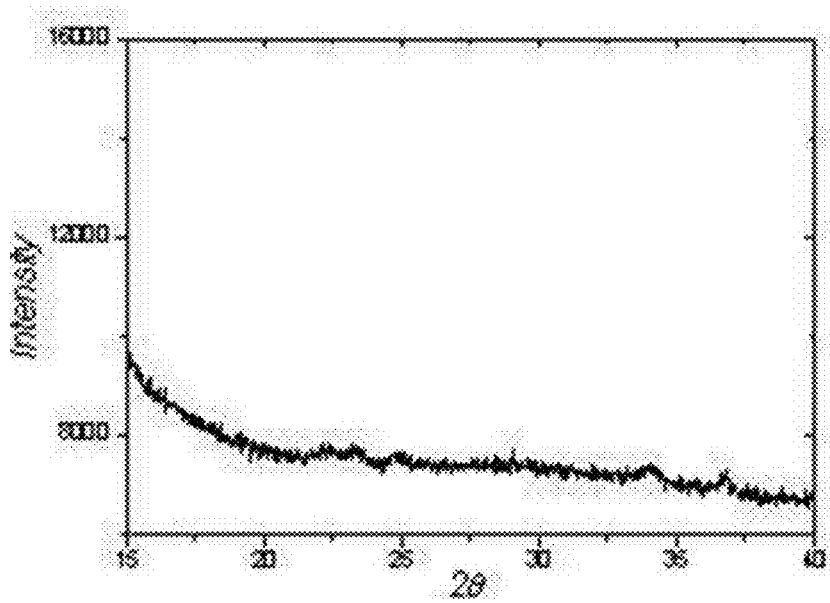
FIG. 1 is an X-ray diffraction (XRD) graph of lithium iron phosphate nanoseed particle which is the precursor of a lithium iron phosphate nanopowder and is prepared according to an embodiment of the present invention (Example 1)

Exemplary embodiments of the present invention will now be described in detail.

In the method for preparing a lithium iron phosphate nanopowder according to the present invention, two simple steps of preparing lithium iron phosphate nanoseed particle and then heat treating the nanoseed particle is performed. A lithium iron phosphate nanopowder including a carbon coating layer on particle may be prepared in a short time and particle size and particle size distribution may be controlled.

In an embodiment for attaining an aspect of the invention, there is provided a method for preparing a lithium iron phosphate nanopowder coated with carbon including (a) preparing a mixture solution by adding a lithium precursor, an iron precursor and a phosphorus precursor in a reaction solvent, (b) putting the reaction mixture into a reactor and reacting to prepare amorphous lithium iron phosphate nanoseed particle, and (c) heat treating the lithium iron phosphate nanoseed particle thus to prepare the lithium iron phosphate nanopowder in which a portion or the whole of the surface of a particle is coated with carbon.

In another embodiment of the present invention, the nanoseed particle prepared in Step (b) may go through at least one step among a cooling step, a washing step and a drying step.

Hereinafter the present invention will be described in detail step by step.

Preparation of Mixture Solution (Step a)

First, a lithium precursor, an iron precursor, and a phosphorus precursor are prepared and added in a reaction solvent to prepare a homogeneous mixture solution.

The lithium precursor thus added may be at least one selected from the group consisting of lithium acetate dihydrate ($CH_3COOLi.2H_2O$), lithium hydroxide monohydrate ($LiOH.H_2O$), lithium hydroxide (LiOH), lithium carbonate ($Li_2CO_3$), lithium phosphate ($Li_3PO_4$), lithium phosphate dodecahydrate ($Li_3PO_4.12H_2O$) and lithium oxalate ($Li_2C_2O_4$), and a mixture thereof.

The iron precursor added may be at least one selected from the group consisting of iron citrate ($FeC_6H_5O_7$), iron citrate hydrate ($FeC_6H_5O_7.nH_2O$), ferrous sulfate heptahydrate ($FeSO_4.7H_2O$), iron(II) oxalate dihydrate ($FeC_2O_4.2H_2O$), iron acetyl acetonate ($Fe(C_5H_7O_2)_3$), iron phosphate dihydrate ($FePO_4.2H_2O$) and ferric hydroxide (FeO(OH)), and a mixture thereof.

The phosphorus precursor added may be at least one selected from the group consisting of tri-ammonium phosphate trihydrate (($NH_4)_3PO_4.3H_2O$), ammonium phosphate (($NH_4)_2HPO_4$), ammonium dihydrogen phosphate ($NH_4H_2PO_4$) and phosphoric acid ($H_3PO_4$), and a mixture thereof.

Meanwhile, the mixing ratio of the lithium precursor, the iron precursor and the phosphorus precursor during the forming of the mixture solution is not specifically limited, and may be, for example, 0.1-10:1:0.1-10 by the molar ratio.

In addition, the iron precursor may be added from about 0.005 to about 10 parts by weight based on 1 part by weight of the reaction solvent, and the lithium precursor and the phosphorus precursor may be added by corresponding molar ratios considering the amount of the iron precursor.

A stirring step may be further conducted during preparing the mixture solution so that the lithium precursor, the iron precursor and the phosphorus precursor may be homogeneously dispersed in the reaction solvent.

Meanwhile, the reaction solvent may be a butandiol solvent which is a non-aqueous solvent and has a relatively high boiling point.

In an embodiment of the present invention, the reaction solvent may include at least one selected from the group consisting of 1,2-butandiol, 1,3-butandiol, 1,4-butandiol, 2,3-butandiol and an isomer thereof.

The boiling point of the 1,2-butandiol is about 195° C., the boiling point of the 1,3-butandiol is about 204° C., the boiling point of the 1,4-butandiol is about 235° C., and the boiling point of the 2,3-butandiol is about 177° C.

The lithium iron phosphate nanopowder was verified to be synthesized at temperature conditions of at least about 150° C., and the nanoseed particle which is the precursor of the lithium iron phosphate nanopowder were verified to be synthesized at temperature conditions of at least about 120° C.

That is, the nanoseed particle is prepared first for the preparation of the lithium iron phosphate nanopowder in the present invention. When the above-described reaction solvents are used, the nanoseed particle may be synthesized at about 120 to 235° C., and Step (b) may be performed at a temperature less than or equal to the boiling point (235° C.) of the reaction solvent. Thus, the vaporization degree of the reaction solvent may decrease, and the pressure increase during the performing of the reaction due to vaporization of solvents may be significantly suppressed when compared to a common hydrothermal synthesis method. Therefore, safety throughout the process may be improved.

In addition, since the above described solvents are non-aqueous, the problem of iron oxidation may be resolved without using a separate reducing agent.

Preparation of Nanoseed Particle of Lithium Iron Phosphate (Step b)

Then, the mixture solution was put into a reactor to perform a reaction. Amorphous lithium iron phosphate nanoseed particle is prepared in this step.

The reactor may be a generally used reactor used for preparing a lithium iron phosphate nanopowder in the art and may be an open type reactor or a closed-type reactor, but is not limited thereto.

The above Step (b) may be performed at a temperature less than or equal to the boiling point of the reaction solvent used, for example, in a range of 120 to 235° C. for 0.1 to 48 hours.

Meanwhile, since the above reaction is not for synthesizing a crystallized lithium iron phosphate nanopowder, but for synthesizing lithium iron phosphate nanoseed particle which is the precursor of the lithium iron phosphate nanopowder, a long time is not necessary for finishing the reaction. Thus, the reaction time of Step (b) for preparing the nanoseed particle is preferably short.

For example, when the reaction solvent used in the present invention is 1,4-butandiol, the above Step (b) may be performed at 120 to 235° C. for 0.1 to 24 hours, and more particularly may be performed at 150 to 235° C. for 0.1 to 5 hours.

The lithium iron phosphate nanoseed particle prepared through the above Step (b) are amorphous. The nanoseed particle is not specifically limited that may be crystallized into the lithium iron phosphate nanopowder through a subsequent heat treating process (Step c).

The lithium iron phosphate nanoseed particle may have a particle size (Hereinafter will be referred to as a particle diameter) of less than or equal to 50 nm.

Meanwhile, the nanoseed particle prepared in the above Step (b) go through at least one step selected from a cooling step, a washing step and a drying step.

For example, the nanoseed particle thus prepared may be cooled first, and then washed consecutively using acetone and methanol.

In addition, the washed nanoseed particle may be dried. The drying method in the drying step is not specifically limited, and may be conducted at a temperature range of 20 to 160° C. for 2 to 40 hours.

Preparation of Lithium Iron Phosphate Nanopowder (Step c)

The lithium iron phosphate nanoseed particle synthesized through the above Step (b) may be heat treated in an inert gas atmosphere to form a lithium iron phosphate nanopowder coated with carbon on a portion or the whole of the surface of individual particle.

The heat treating is not specifically limited and may be conducted by heating to a temperature range of 400 to 900° C. for 0.5 to 5 hours, for example.

The heat treating may be conducted in an inert gas atmosphere, for example in an argon (Ar) or a nitrogen ($N_2$) gas atmosphere.

The lithium iron phosphate nanopowder prepared in Step (c) is obtained by crystallizing the amorphous nanoseed particle prepared in Step (b) through the heat treatment. Powder particle may be obtained through the crystallization.

In addition, the carbon coating layer may be formed on a portion or the whole of the surface of the powder particle while performing the crystallization.

Particularly, the precursor of the carbon coating layer may be the reaction solvent remaining on the surface of the particle after use. A portion of the reaction solvent used may remain on the surface of the particle after conducting the drying step and may be carbonized during the heat treatment at a temperature range of 400 to 900° C., thereby forming the carbon coating layer on the surface of the particle.

A separate organic compound may be used as the precursor of the carbon coating layer, and the addition step of the separate organic compound for forming the carbon coating layer on the surface of the lithium iron phosphate nanopowder particle is not specifically limited.

In an embodiment of the present invention, the organic compound may be mixed with the solvent together with the lithium precursor, the iron precursor and the phosphorus precursor during the forming of the mixture solution.

In another embodiment, the organic compound may be put after forming the lithium iron phosphate nanoseed particle.

In further another embodiment, the nanoseed particle is formed, and washing and drying processes are performed. Thereafter, the organic compound may be added. Alternatively, the organic compound may be added during the heat treatment in the above Step (c).

The organic compound is not specifically limited, and may be at least one selected from the group consisting of glucose, sucrose, galactose, fructose, lactose, starch, mannose, ribose, aldohexose, ketohexose, and a combination thereof, or a mixture of two or more thereof.

Meanwhile, the amount of the organic compound added may be from 0.1 to 5 wt % based on the total amount of the nanoseed particle. When the amount of the organic compound exceeds the upper limit of the range, the thickness of the carbon coating layer may become unnecessarily large.

The thickness of the carbon coating layer formed on the surface of the lithium iron phosphate nanopowder particle prepared through the above-described processes may be less than or equal to 10 nm, and may be from 1 to 5 nm.

Since the lithium iron phosphate powder has low electric conductivity, the electric conductivity of the lithium iron phosphate powder may be supplemented by forming the carbon coating layer on a portion of or the whole surface of the minute lithium iron phosphate powder particle thus prepared.

The lithium iron phosphate nanopowder particle prepared through the series of the above-described steps may have an olivine structure, and include a carbon coating layer formed on a portion or the whole of the surface of the particle.

The particle size and the particle size distribution of the particle thus prepared may be primarily controlled by changing the kind of the lithium precursor, the iron precursor, or the phosphorus precursor, or regulating reaction temperature and reaction time of the above Step (b) and secondly controlled by regulating reaction temperature and reaction time of the above Step (c). Generally, the size of the particle may increase when the reaction temperature is elevated or the reaction time is prolonged.

The particle diameter of the lithium iron phosphate nanopowder prepared through the above-described processes is not specifically limited, and may be, for example, 30 to 300 nm. The particle size distribution is not specifically limited and may be, for example, less than or equal to 50% of the average value of the particle diameter.

Preparation of Lithium Secondary Battery

In the present invention, a cathode active material including the lithium iron phosphate nanopowder having the olivine crystal structure may be provided. The cathode active material may further include a conductive agent, a binder and a filler other than the lithium iron phosphate powder selectively.

The conductive agent may include any material having conductivity and not inducing a chemical change in a battery without specific limitation, and may include graphite such as natural graphite and synthetic graphite; carbon blacks such as carbon black, acetylene black, ketchen black, channel black, furnace black, lamp black, and thermal black; conductive fibers such as a carbon fiber and a metal fiber; metal powders such as a carbon fluoride powder, an aluminum powder and a nickel powder; conductive whiskers such as zinc oxide and potassium titanate; conductive metal oxides such as titanium oxide; and conductive materials such as a polyphenylene derivative.

Generally, the conductive agent may be included by 1 to 30 wt % based on the total amount of a mixture including the cathode active material.

The binder may be any component that assists the bonding of the active material and the conductive agent and the bonding with a current collector without specific limitation, and may include, for example, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, a styrene butadiene rubber, a fluorine rubber, various copolymers, etc.

Generally, the binder may be included by 1 to 30 wt % based on the total amount of a mixture including the cathode active material.

The filler is a component suppressing the expansion of an electrode and may be selectively used. The filler may be any fibrous material that may not induce a chemical change in the battery, without specific limitation, and may include, for example, an olefin-based polymer such as polyethylene and polypropylene; and a fibrous material such as a glass fiber and a carbon fiber.

In addition, in an embodiment of the present invention, a cathode for a lithium secondary battery obtained by coating the cathode active material on a current collector is provided.

The cathode for the lithium secondary battery may be fabricated by, for example, dissolving the cathode active material in a solvent to prepare a slurry, coating the slurry on the current collector, drying and pressing.

The current collector of the cathode may be any material having conductivity and not inducing chemical change of the battery, without specific limitation, and may include, for example, stainless steel; aluminum; nickel; titanium; fired carbon; or a surface treated material of the aluminum or the stainless steel with carbon, nickel, titanium, silver, etc.

Generally, the current collector may have a thickness of 3 to 500 μm, and minute embossing may be formed on the surface of the current collector to increase the adhesiveness of the cathode active material.

Various shapes such as a film, a sheet, a foil, a net, a porous material, a foamed material, a non-woven fabric, etc. may be used as the current collector.

In addition, in an embodiment of the present invention, a lithium secondary battery including a cathode including the cathode active material, an anode, a separator and anon-aqueous electrolyte containing a lithium salt may be provided.

The anode may be fabricated by, for example, coating an anode mixture including an anode active material on an anode current collector, and drying. In the anode mixture, the above-described components such as the conductive agent, the binder and the filler may be included as occasion demands.

The anode current collector may be any material having high conductivity and not inducing the chemical change of the battery, without specific limitation, and may include, for example, copper; stainless steel; aluminum; nickel; fired carbon; a surface treated material of copper or stainless steel with carbon, nickel, titanium, silver, etc.; and an alloy of aluminum-cadmium.

Meanwhile, the current collector may have the thickness of 3 to 500 μm, and minute embossing may be formed on the surface of the current collector to increase the adhesiveness of the anode active material as in the cathode current collector. Various shapes such as a film, a sheet, a foil, a net, a porous material, a foamed material, a non-woven fabric, etc. may be used as the current collector.

The separator is disposed between the cathode and the anode, and an insulating thin film having high ion transmittance and high mechanical strength may be used.

The pore diameter of the separator may be generally from 0.01 to 10 μm, and the thickness thereof may be generally from 5 to 300 μm.

The separator may include a chemical resistant and hydrophobic olefin-based polymer such as polypropylene; a sheet or a non-woven fabric formed by using a glass fiber or polyethylene, etc.

When a solid electrolyte such as a polymer is used as the electrolyte, the solid electrolyte may also play the role of the separator.

The non-aqueous electrolyte containing the lithium salt includes the electrolyte and the lithium salt, and the electrolyte may include a non-aqueous organic solvent or an organic solid electrolyte.

The non-aqueous organic solvent may include, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc. The organic solid electrolyte may include, for example, polyethylene derivatives, polyethylene oxide derivatives, polypropylene oxide derivatives, a phosphoric acid ester polymer, poly agitation lysine, polyester sulfide, polyvinyl alcohol, polyvinylidene fluoride, and a polymer containing an ionic dissociable group.

The lithium salt may include a material favorably soluble in the non-aqueous electrolyte such as LiCl, LiBr, LiI, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, a low molecular weight aliphatic lithium carbonate, lithium 4-phenylborate, imide, etc.

In addition, the electrolyte may further include (for improving charge and discharge properties, and flame retardance, etc.), for example, pyridine, triethyl phosphite, triethanolamine, a cyclic ether, ethylenediamine, n-glyme, hexaphosphoric acid amide, nitrobenzene derivatives, sulfur, a quinone imine dye, N-substituted oxazolidinone, N,N-substituted imidazolidine, an ethylene glycol dialkyl ether, an ammonium salt, pyrrole, 2-methoxyethanol, trichloro aluminum, etc. A halogen-containing solvent such as carbon tetrachloride, trifluoroethylene, etc. may be further included to impart incombustibility, and a carbon dioxide gas may be further included to improve preservation properties at a high temperature.

As described above, the method for preparing the lithium iron phosphate nanopowder coated with carbon of the present invention may be performed at relatively lower pressure conditions when compared to a common hydrothermal synthesis method, a supercritical hydrothermal synthesis method or a glycothermal synthesis method by using a novel reaction solvent. In addition, since a high temperature/high pressure reactor is not used, the process safety and economical feasibility may be secured, while the particle size and the particle size distribution of the lithium iron phosphate nanopowder may be effectively controlled.

In addition, through the simple two steps of preparing the nanoseed particle and heat treating thereof, the nanopowder having controlled particle size and particle size distribution may be prepared, and the carbon coating layer may be formed on the particle without performing a separate heat treatment. Thus, the process is economic, and mass production would be favorable. In addition, since the electric conductivity of the lithium iron phosphate nanopowder prepared by the above method could be supplemented, the properties of a cathode active material may be improved, and the cathode active material may be industrially useful.

EXAMPLES

Exemplary embodiments of the invention will be described below in more detail. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Examples 1a, 1b and 1c 2.5179 g of lithium hydroxide hydrate (LiOH.H$_2$O), 14.6964 g of ferric citrate hydrate (FeC$_6$H$_5$O$_7$.nH$_2$O) and 5.88 g of phosphoric acid (H$_3$PO$_4$) were added in 300 ml of 1,4-butanediol and sufficiently stirred to prepare a mixture solution.

The sufficiently stirred mixture solution was put into a 500 ml reactor and a reaction was performed at 190° C. for 2 hours.

After finishing the reaction, the remaining reactant was cooled and washed consecutively using acetone and methanol.

After washing, the product was dried in a vacuum drier.

Figure 2:
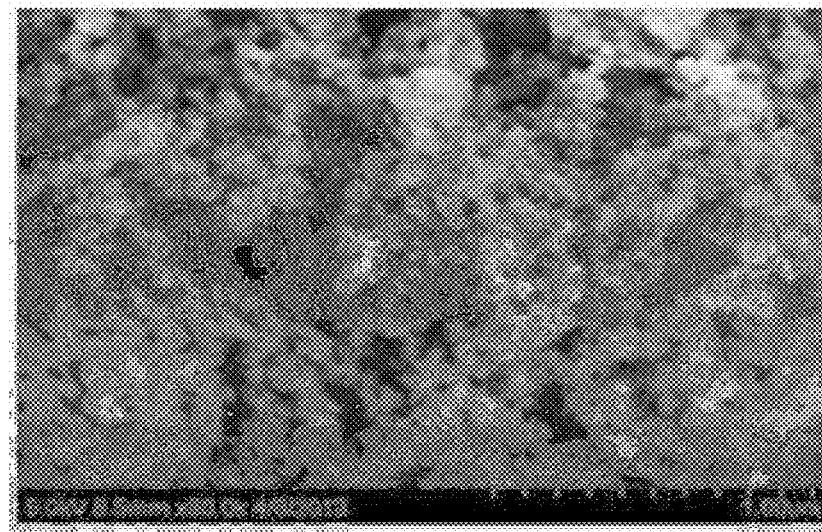
FIG. 2 is a photographic image of a scanning electron microscope (SEM) of lithium iron phosphate nanoseed particle which is the precursor of a lithium iron phosphate nanopowder and is prepared according to an embodiment of the present invention (Example 1)

After finishing the washing and drying, the reaction product thus obtained was analyzed with an X-ray diffraction spectroscopy and a scanning electron microscope. The reaction product was confirmed to be amorphous lithium iron phosphate nanoseed particle (See FIGS. 1 and 2).

Then, the amorphous lithium iron phosphate nanoseed particle thus prepared was heat treated in a furnace at 500° C. (a) (Example 1a), 600° C. (b) (Example 1b), and 700° C. (c) (Example 1c), respectively for 2 hours under an argon (Ar) atmosphere.

Figure 3:
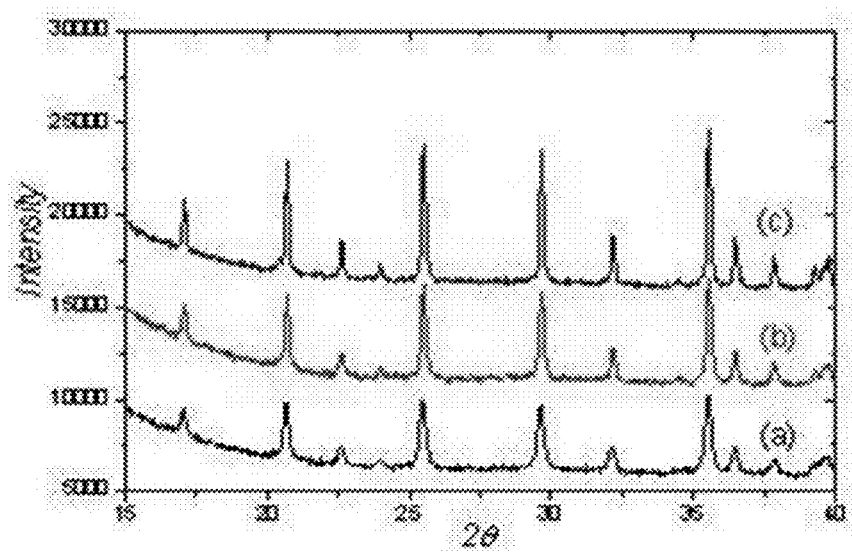
FIG. 3 illustrates X-ray diffraction (XRD) graphs of lithium iron phosphate nanopowder coated with carbon prepared by changing the temperature of heat treating according to embodiments of the present invention (Examples 1a, 1b and 1c)
Figure 4:
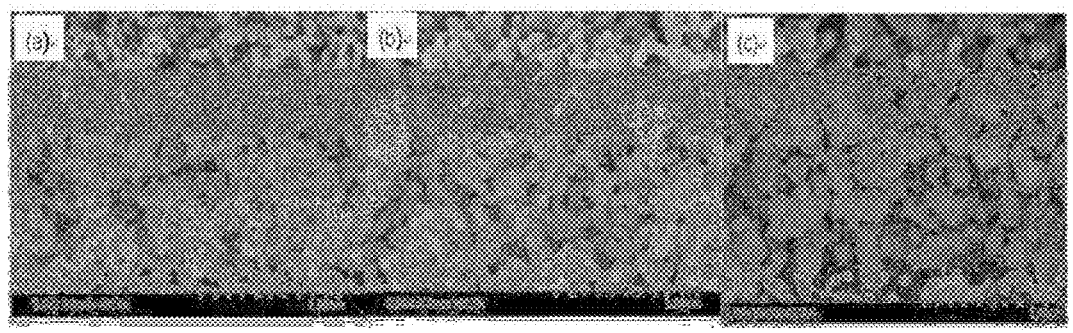
FIG. 4 illustrates photographic images of a scanning electron microscope (SEM) of lithium iron phosphate nanopowder coated with carbon prepared by changing the temperature of heat treating according to embodiments of the present invention (Examples 1a, 1b and 1c)

The products thus obtained after the heat treatment were analyzed with an X-ray diffraction spectroscopy and a scanning electron microscope, and the production of lithium iron phosphate nanopowder including uniform primary particle having a particle diameter of 50 nm (See graph (a) in FIG. 3 and photographic image (a) in FIG. 4) (Example 1a), uniform primary particle having a particle diameter of 100 nm (See graph (b) in FIG. 3 and photographic image (b) in FIG. 4) (Example 1b), and uniform primary particle having a particle diameter of 150 nm (See graph (c) in FIG. 3 and photographic image (c) in FIG. 4) (Example 1c), was confirmed.

Figure 5:
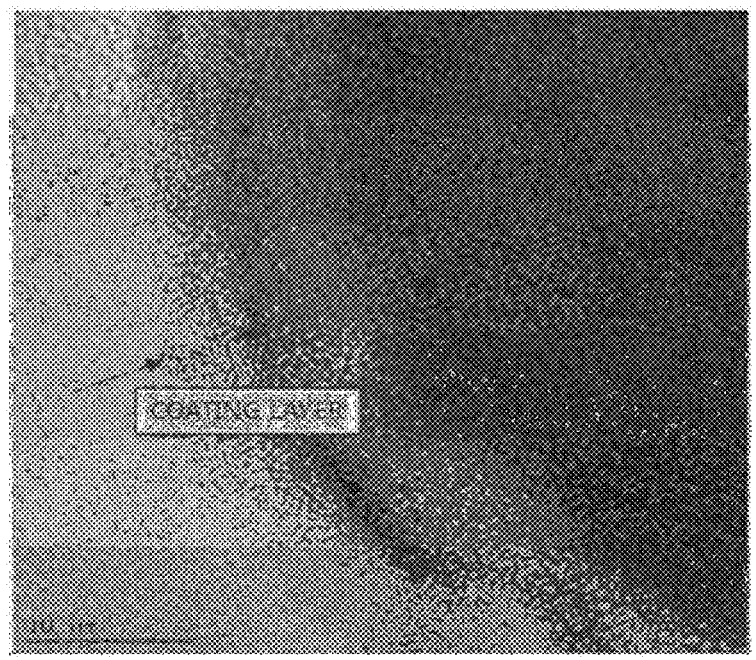
FIG. 5 is a photographic image of a transmission electron microscope (TEM) of a lithium iron phosphate nanopowder coated with carbon prepared according to an embodiment of the present invention (Example 1c)

In addition, the nanopowder of Example 1c was analyzed with a transmission electron microscope to confirm the formation of the carbon coating layer. The carbon coating layer having a thickness of 1 to 5 nm was found on the surface of the lithium iron phosphate nanopowder (See FIG. 5).

Example 2

2.5179 g of lithium hydroxide hydrate (LiOH.2H$_2$O), 14.6964 g of ferric citrate hydrate (FeC$_6$H$_5$O$_7$.nH$_2$O) and 5.88 g of phosphoric acid (H$_3$PO$_4$) were added in 300 ml of 1,4-butanediol and sufficiently stirred to prepare a mixture solution.

The sufficiently stirred mixture solution was put into a 500 ml reactor and a reaction was performed at 190° C. for 2 hours.

Thereafter, 0.54 g of glucose was added in the reactant, and the reaction was further performed for 30 minutes while maintaining the same temperature.

After finishing the reaction, the remaining reactant was cooled and washed consecutively using acetone and methanol.

After washing, the product was dried in a vacuum drier.

After finishing the washing and drying, the reaction product thus obtained (nanoseed particle) was heat treated in a furnace at 500° C. for 2 hours under an argon (Ar) atmosphere.

Figure 6:
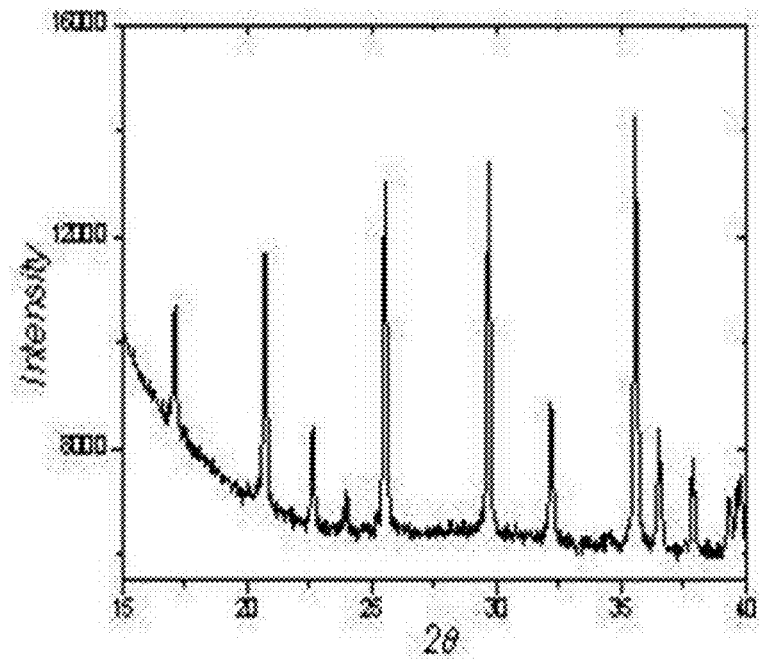
FIG. 6 is an X-ray diffraction (XRD) graph of a lithium iron phosphate nanopowder prepared according to an embodiment of the present invention (Example 2)
Figure 7:
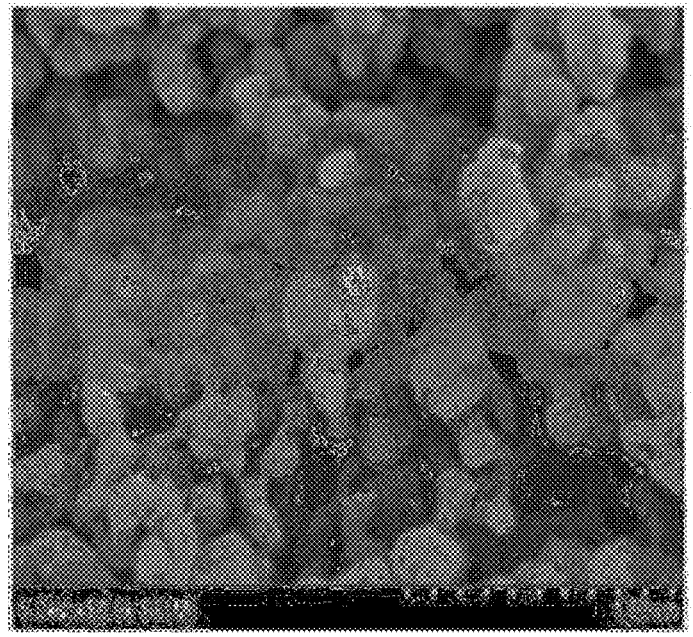
FIG. 7 is a photographic image of a scanning electron microscope (SEM) of a lithium iron phosphate nanopowder prepared according to an embodiment of the present invention (Example 2)

The product obtained through the heat treatment was analyzed with an X-ray diffraction spectroscopy and a scanning electron microscope. The reaction product was confirmed to be a lithium iron phosphate nanopowder including uniform primary particle having a particle diameter of 130 nm (See FIGS. 6 and 7).

Figure 8:
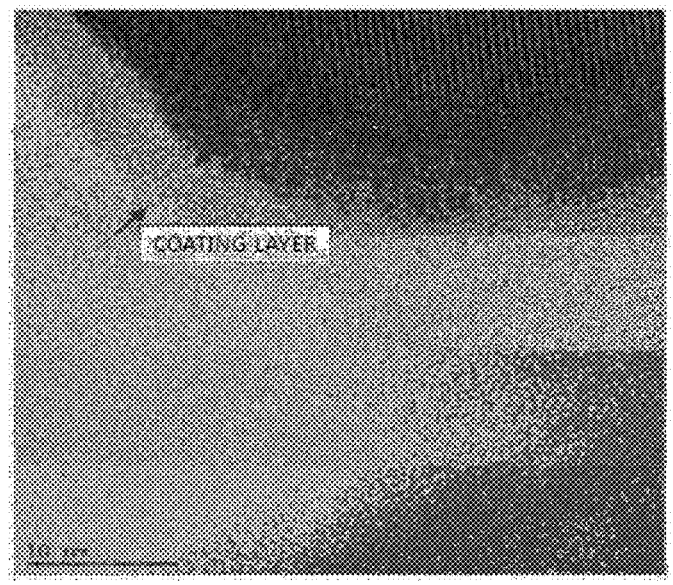
FIG. 8 is a photographic image of a transmission electron microscope (TEM) of a lithium iron phosphate nanopowder coated with carbon prepared according to an embodiment of the present invention (Example 2)

In addition, the nanopowder was analyzed with a transmission electron microscope to confirm the formation of the carbon coating layer. The carbon coating layer having a thickness of 1 to 5 nm was found on the surface of the lithium iron phosphate nanopowder (see FIG. 8).

Comparative Example 1

0.42 g of lithium hydroxide hydrate (LiOH.2H$_2$O), 2.45 g of ferric citrate hydrate (FeC$_6$H$_5$O$_7$.nH$_2$O) and 0.98 g of phosphoric acid (H$_3$PO$_4$) were added in 50 ml of ethylene glycol and sufficiently stirred to prepare a mixture solution.

The sufficiently stirred mixture solution was put into a 100 ml high temperature/high pressure hydrothermal reactor and a reaction was performed at 210° C. for 18 hours.

After finishing the reaction, the remaining reactant was cooled and washed consecutively using acetone and methanol.

After washing, the product was dried in a vacuum drier.

Figure 9:
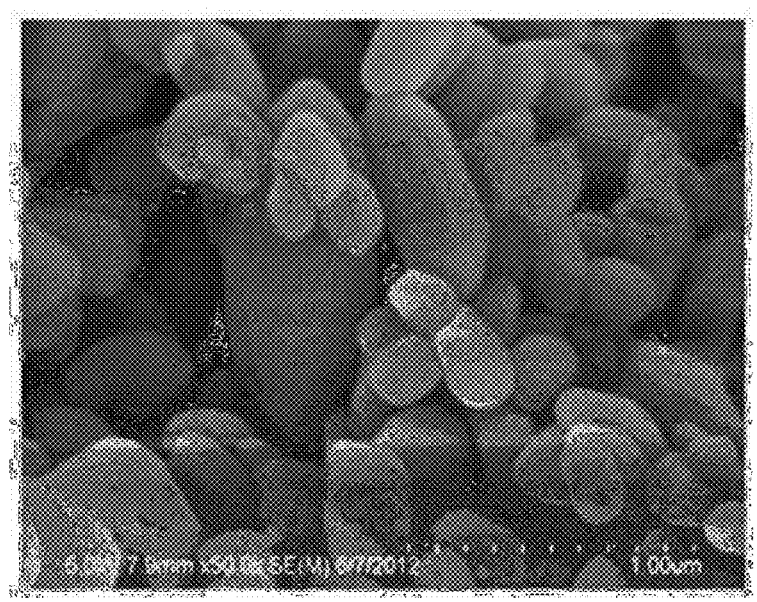
FIG. 9 is a photographic image of a scanning electron microscope (SEM) of a lithium iron phosphate nanopowder prepared according to a comparative example (Comparative Example 1).

After finishing the washing and drying, the reaction product thus obtained was analyzed with an X-ray diffraction spectroscopy and a scanning electron microscope. The reaction product was confirmed to be a lithium iron phosphate powder having a particle diameter of 200 to 1000 nm, and was confirmed to be a lithium iron phosphate powder having a large particle size and non-uniform particle size distribution (See FIG. 9).

As shown through the examples and the comparative example, the lithium iron phosphate nanopowder prepared by the method of the present invention has small and uniform particle size and good particle size distribution properties.

What is claimed is:
1. A method for preparing a lithium iron phosphate nanopowder coated with carbon, comprising the steps of:
   (a) preparing a non-aqueous mixture solution by adding a lithium precursor, an iron precursor and a phosphorus precursor in a non-aqueous butanediol solvent;
   (b) putting the non-aqueous mixture solution into a reactor and reacting to prepare amorphous lithium iron phosphate nanoseed particle under pressure conditions of less than or equal to 10 bar; and
   (c) heat treating the lithium iron phosphate nanoseed particle thus to prepare the lithium iron phosphate nanopowder coated with carbon on a portion or a whole of a surface of the nanoseed particle.

2. The method for preparing a lithium iron phosphate nanopowder coated with carbon of claim 1, wherein the nanoseed particle prepared in the above Step (b) go through at least one step among a cooling step, a washing step and a drying step.

3. The method for preparing a lithium iron phosphate nanopowder coated with carbon of claim 2, wherein the washing is performed by consecutively using acetone and methanol.

4. The method for preparing a lithium iron phosphate nanopowder coated with carbon of claim 2, wherein the drying is performed at a temperature range of 20 to 160° C. for 2 to 40 hours.

5. The method for preparing a lithium iron phosphate nanopowder coated with carbon of claim 1, further comprising the step of adding an organic compound in the above Step (a), Step (b), or Step (c).

6. The method for preparing a lithium iron phosphate nanopowder coated with carbon of claim 5, wherein the organic compound is at least one selected from the group consisting of glucose, sucrose, galactose, fructose, lactose, starch, mannose, ribose, aldohexose, ketohexose, and a mixture thereof.

7. The method for preparing a lithium iron phosphate nanopowder coated with carbon of claim 5, wherein the amount of the organic compound is 0.1 to 5 wt % based on a total amount of the lithium iron phosphate nanoseed particle prepared in Step (b).

8. The method for preparing a lithium iron phosphate nanopowder coated with carbon of claim 1, wherein the non-aqueous butanediol solvent is at least one selected from the group consisting of 1,2-butandiol, 1,3-butandiol, 1,4-butandiol, 2,3-butandiol, and an isomer thereof.

9. The method for preparing a lithium iron phosphate nanopowder coated with carbon of claim 1, wherein the above Step (b) is performed at a temperature less than or equal to a boiling point of the non-aqueous butanediol solvent.

10. The method for preparing a lithium iron phosphate nanopowder coated with carbon of claim 1, wherein the above Step (b) is performed at a temperature range of 120 to 235° C. for 0.1 to 24 hours.

11. The method for preparing a lithium iron phosphate nanopowder coated with carbon of claim 1, wherein the above Step (b) is performed at a temperature range of 150 to 235° C. for 0.1 to 5 hours.

12. The method for preparing a lithium iron phosphate nanopowder coated with carbon of claim 1, wherein the above Step (c) is performed at a temperature range of 400 to 900° C. for 0.5 to 5 hours.

13. The method for preparing a lithium iron phosphate nanopowder coated with carbon of claim 1, wherein the lithium precursor is at least one selected from the group consisting of lithium acetate dihydrate ($CH_3COOLi.2H_2O$), lithium hydroxide monohydrate ($LiOH.H_2O$), lithium hydroxide (LiOH), lithium carbonate ($Li_2CO_3$), lithium phosphate ($Li_3PO_4$), lithium phosphate dodecahydrate ($Li_3PO_4.12H_2O$) and lithium oxalate ($Li_2C_2O_4$), and a mixture thereof.

14. The method for preparing a lithium iron phosphate nanopowder coated with carbon of claim 1, wherein the iron precursor is at least one selected from the group consisting of iron citrate ($FeC_6H_5O_7$), iron citrate hydrate ($FeC_6H_5O_7.nH_2O$), ferrous sulfate heptahydrate ($FeSO_4.7H_2O$), iron(II) oxalate dihydrate ($FeC_2O_4.2H_2O$), iron acetyl acetonate ($Fe(C_5H_7O_2)_3$), iron phosphate dihydrate ($FePO_4.2H_2O$) and ferric hydroxide (FeO(OH)), and a mixture thereof.

15. The method for preparing a lithium iron phosphate nanopowder coated with carbon of claim 1, wherein the phosphorus precursor is at least one selected from the group consisting of tri-ammonium phosphate trihydrate (($NH_4)_3PO_4.3H_2O$), ammonium phosphate (($NH_4)_2HPO_4$), ammonium dihydrogen phosphate ($NH_4H_2PO_4$) and phosphoric acid ($H_3PO_4$), and a mixture thereof.

* * * * *